United States Patent [19]

Fujita et al.

[11] Patent Number: 4,821,106
[45] Date of Patent: Apr. 11, 1989

[54] APPARATUS FOR LOADING TELEVISION CAMERA OR THE LIKE

[75] Inventors: Iwao Fujita, Tokyo; Masahiro Maesuna, Kawasaki; Tamiki Umemura, Yokohama, all of Japan

[73] Assignee: Shotoku Ltd., Japan

[21] Appl. No.: 128,647

[22] Filed: Dec. 4, 1987

[30] Foreign Application Priority Data

Dec. 12, 1986 [JP] Japan ................. 61-294748

[51] Int. Cl.⁴ ...................... H04N 5/232; H04N 5/247
[52] U.S. Cl. ................... 358/229; 352/243; 354/74; 354/293
[58] Field of Search ............ 358/229, 108, 109, 93; 354/70, 74, 293; 352/242, 243

[56] References Cited

U.S. PATENT DOCUMENTS

| | | | |
|---|---|---|---|
| 2,315,406 | 3/1943 | Eddy | 358/229 |
| 2,380,829 | 7/1945 | Eddy | 358/229 |
| 4,236,794 | 12/1980 | Gordon | 358/227 |
| 4,731,669 | 3/1988 | Hayashi | 358/229 |

*Primary Examiner*—Tommy P. Chin
*Attorney, Agent, or Firm*—Fidelman & Wolffe

[57] ABSTRACT

An apparatus for loading a television camera or the like having a tilt mechanism for tilting a tilt stand supporting the camera, a pan mechanism for turning the turning stand supporting this tilt mechanism in the horizontal plane, a cam mechanism for adjusting the weight balance of the camera on the tilt stand by the cam and the cam roller. A stop mechanism for holding the tilt stand of the tilt mechanism by a stop pin so that it may not be tilted is provided which has an eccentric shaft portion at the tip portion of the stop pin so that when the pin is inserted into the receiving hole of the side plate and turned, its eccentric action may cause the cam to be lifted from the cam roller along with the tilt stand.

2 Claims, 2 Drawing Sheets

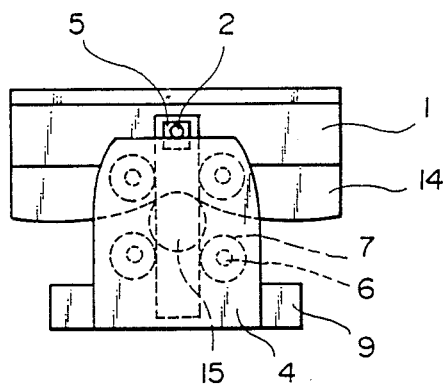
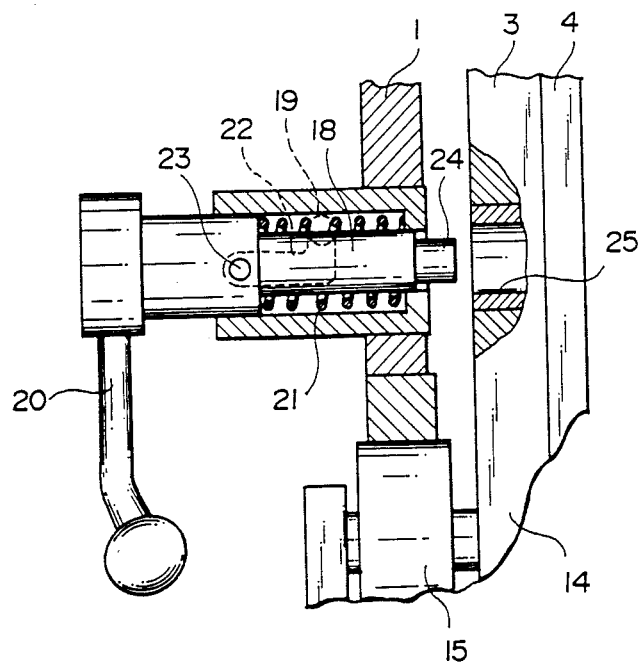

APPARATUS FOR LOADING TELEVISION CAMERA OR THE LIKE

FIELD OF THE INVENTION

The present invention relates to an improvement of the apparatus for loading (i.e., supporting) a television camera or the like which is constructed so that the television camera or the like may be loaded to allow the entire camera operation such as tilting, panning and the like to be smoothly carried out.

BACKGROUND OF THE INVENTION

Conventionally, an apparatus for loading the television camera or the like called a "cam head" has frequently been used. This cam head comprises a tilt mechanism and a pan mechanism, the former being designed such that a tilt stand for bearing the camera can be tilted upwardly and downwardly within the extend of 50 degrees respectively with respect to the tilt axis, while the latter being designed such that a turning stand may make a full turn within the horizontal plane with the pan axis as its center. The tilt mechanism is attached to the turning stand of the pan mechanism.

Thus in the above-described tilt mechanism, the weight balance of the television camera may be realized by means of the cam mechanism which comprises a special cam and a cam roller contacting therewith.

Moreover, since when the camera and the like are loaded or unloaded or the apparatus is carried the movement of the tilt stand in the tilt direction should be constrained for safety consideration, a stop mechanism is mounted for inserting the tip portion of a stop pin attached to the side of the tilt stand into the receiving hole of a side plate.

In the above-described arrangement of the cam head, since the cam and the cam roller are constantly held in contact with each other, when the articles are loaded or unloaded or the apparatus is carried, vibration and impact can be applied to the contact surface between them, resulting in the damage of the cam surface.

SUMMARY OF THE INVENTION

According to the present invention there is provided an apparatus for loading the television camera or the like including a tilt mechanism for tilting the tilt stand supporting the camera with the tilt axis as its center, a pan mechanism for turning the turning stand supporting this tilt mechanism in the horizontal plane, a cam mechanism for adjusting the weight balance of the camera on the tilt stand by the cam and the cam roller, and a stop mechanism for holding the tilt stand of the tilt mechanism by the stop pin so that it may not be tilted. An eccentric shaft portion is provided at the tip portion of the stop pin so that when the pin is inserted into the receiving hole of the side plate and turned its eccentric action may cause the cam to be floated from the cam roller along with the tilt stand.

In the above-described arrangement when the stop pin is inserted into the receiving hole of the side plate and turned, the eccentric motion is caused between the eccentric portion of the tip of the pin and the receiving hole, being transmitted as it is to the tilt stand and the cam integral therewith via the stop mechanism with the result that the cam is floated from the cam roller.

BRIEF DESCRIPTION OF THE DRAWINGS

The present invention will be understood and appreciated more fully from the following detailed description taken in conjunction with the drawings in which;

FIG. 2 is a side elevational view of the cam mechanism, and FIG. 3 is an enlarged longitudinal cross-sectional view of the stop mechanism.

DETAILED DESCRIPTION OF A PREFERRED EMBODIMENT

Figure 1:
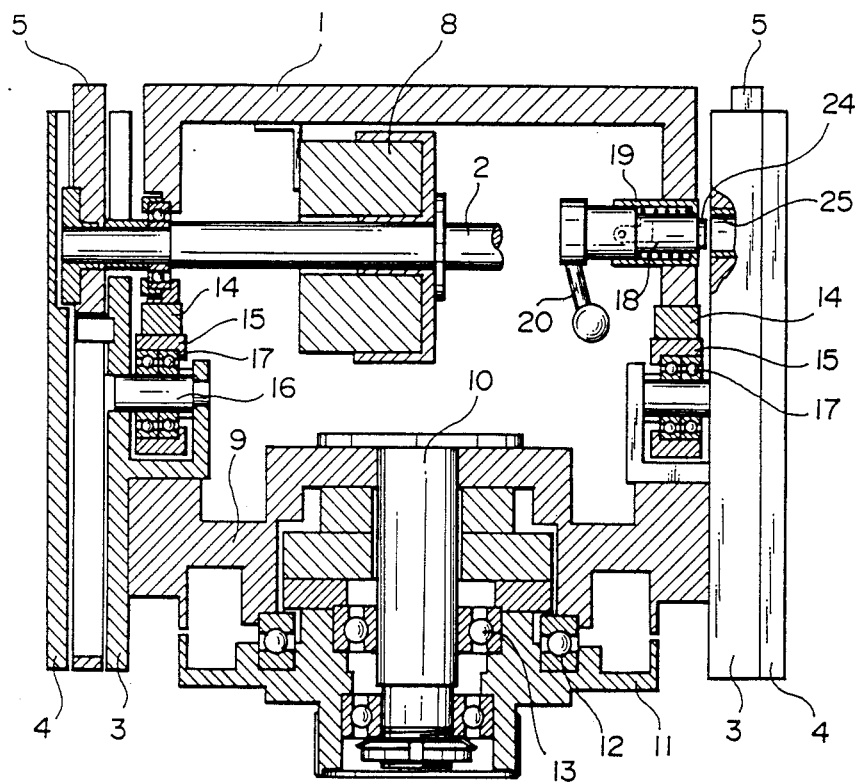
FIG. 1 is a longitudinal cross-sectional view of the apparatus for loading the television camera or the like, illustrating a preferred embodiment of the present invention.

FIGS. 1 to 3 respectively illustrate a preferred embodiment arranged in accordance with the present invention.

Reference numeral 1 is a tilt stand comprising a tilt mechanism which is designed so that it can be upwardly and downwardly tilted with respect to the horizontal plane respectively within the range of 50 degrees with a tilt shaft 2 as its axis.

At both sides of the tilt stand 1 is positioned a support which comprises a side plate 3 and a cover plate 4, within which a guide bar 5 is disposed in such a way that it may vertically be guided by a bearing 7 supported; by a shaft 6, the above-described tilt shaft 2 being inserted into the bar 5. 8 denotes a fine tune portion which may offer smooth feeling to the operator or be fixed to various brake mechanism (not shown) by connecting relatively moving portions therewith. 9 is a turning stand comprising a pan mechanism, which can be turned in the horizontal plane with a pan shaft 10 as its axis within the range of 360 degrees. 11 is a base and 12 and 13 are bearings. 14 is a cam of the cam mechanism and 15 a cam roller. The cam is mounted onto the tilt stand 1 while the roller 15 is supported by the side plate 3. The tilt mechanism is supported by the turning stand 9. 16 is a shaft for supporting the roller and 17 a bearing.

18 is a pin shaft of the stop mechanism, 19 a holding cylinder, 20 an operation lever, 21 a return spring, 22 a L-shaped guide channel provided along the holding cylinder, 23 a protrusion provided for the pin shaft 18 at the end of which an eccentric shaft 24 is provided.

On the other hand, a receiving hole 25 is defined through the side plate 3 at a location where when the tilt angle is equal to zero the stop pin shaft 18 and an axial line will come into alignment with each other.

Thus when the tilt angle is zero, if the eccentric shaft 24 at the end of the pin shaft 18 is inserted into the hole 25 and turned by means of the lever 20, the eccentric shaft 24 is downwardly moved as shown in FIG. 3 so that the cam 14 is lifted from the cam roller 15. What is more, the tilt stand 1 is supported by the side plate via the stop mechanism without the cam 14 coming in contact with the cam roller 15.

In the operation of the above-described stop mechanism, the pin shaft 18 is guided and limited by the protrusion 23 at the side of the pin shaft and the guide channel 22 at the side of the holding cylinder 19.

When the pin shaft 18 is turned in the opposite direction, the eccentric shaft 24 is disengaged from the receiving hole 25 of the side plate with the result that it is restored to the original position by the spring 21.

Incidentally, when the cam is lifted off the cam roller 15, since the entire load of the article is applied to the eccentric shaft of the stop pin and hole, the pin is not likely to be restored without particularly locking the stop pin.

Usually the above-described stop mechanisms are provided at both left and right sides of the tilt stand, but if more than those are provided, stability will be increased when the cam is lifted.

As described above, if the eccentric shaft is provided at the end of the stop pin shaft and is turned by inserting it into the receiving hole of the side plate, the cam can be held in a manner in which it is lifted from the cam roller with the result that when the television camera is loaded or unloaded or the apparatus is carried, the tilt stand can be held in no-tilting state through the manipulation of the stop mechanism while the cam can be prevented from the damage caused by the cam roller due to the vibration or other types of impacts.

Specifically, according to the present invention, since the used of a stop mechanism permits the cam to be lifted from the cam roller, there is no need to provide a special mechanism for lifting the cam.

Furthermore, in the loading apparatus, when the loaded articles are exchanged it is necessary to exchange the cam by selecting it in accordance with the height of the center of gravity for those articles. For this purpose, conventionally it was necessary to remove them and further release the mobile portion of the apparatus so that the cam may be exchanged. According to the invention, since the cam can be held in the state in which it is lifted off the cam roller with the camera loaded, it becomes possible to exchange the cam rapidly and readily.

It will be appreciated by persons skilled in the art that the present invention is not limited by what has been particularly shown and described hereinabove. Rather the scope of the present invention is defined only by the claim which follows;

What is claimed is;

1. An apparatus for supporting a television camera or similar device, comprising:

a tilt stand, said tilt stand having a tilt axis;

tilt means for tilting said tilt stand about its tilt axis;

a turning stand for supporting the tilt stand;

pan means for turning said turning stand;

cam means for adjusting a weight balance on said tilt stand, cam means comprising a cam which cooperates with a cam roller; and stop means for holding said tilt stand so that it cannot be tilted, said stop means comprising lifting means for lifting said cam from said cam roller when said stop means holds the tilt stand so that it cannot be tilted.

2. The apparatus as claimed in claim 1, further comprising a side plate supported on said turning stand, wherein said stop means comprises a receiving hole in said side plate and a stop pin attached to said tilt stand and said lifting means comprises an eccentric shaft portion located at an end portion of said stop pin, wherein said stop pin is engagable with said receiving hole so as to hold the tilt stand so that it cannot be tilted, and when said stop pin is engaged with said receiving hole and turned, the eccentric shaft portion cooperates with the receiving hole to lift said cam from said cam roller.

* * * * *